United States Patent
Compton et al.

(10) Patent No.: US 10,079,883 B2
(45) Date of Patent: Sep. 18, 2018

(54) PRIMARY DEVICE SELECTION AT OPERATING SYSTEM INITIALIZATION

(71) Applicant: International Business Machines Corporation, Armonk, NY (US)

(72) Inventors: Scott B. Compton, Hyde Park, NY (US); Dale F. Riedy, Poughkeepsie, NY (US); William J. Rooney, Hopewell Junction, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/958,425

(22) Filed: Dec. 3, 2015

(65) Prior Publication Data
US 2017/0163726 A1 Jun. 8, 2017

(51) Int. Cl.
*G06F 15/16* (2006.01)
*H04L 29/08* (2006.01)
*G06F 11/07* (2006.01)

(52) U.S. Cl.
CPC ......... *H04L 67/1095* (2013.01); *G06F 11/07* (2013.01); *H04L 67/1097* (2013.01)

(58) Field of Classification Search
CPC ............ H04L 67/1095; H04L 67/1097; G06F 3/0605; G06F 3/0632; G06F 3/067
USPC ...................................................... 709/219
See application file for complete search history.

(56) References Cited

U.S. PATENT DOCUMENTS

| 5,889,935 | A | * | 3/1999 | Ofek ................... G06F 11/2066 709/217 |
| 6,499,112 | B1 | | 12/2002 | Mililo et al. |
| 6,947,981 | B2 | | 9/2005 | Lubbers et al. |
| 6,996,672 | B2 | | 2/2006 | Lubbers et al. |
| 8,782,358 | B2 | | 7/2014 | Broido et al. |
| 8,856,233 | B2 | | 10/2014 | Lacapra et al. |
| 9,052,833 | B2 | | 6/2015 | Petersen et al. |
| 2005/0193180 | A1 | * | 9/2005 | Fujibayashi .......... G06F 3/0607 711/162 |
| 2011/0093862 | A1 | * | 4/2011 | Doatmas ............... G06F 3/0617 718/105 |
| 2014/0122816 | A1 | * | 5/2014 | Barnes ................... G06F 11/20 711/162 |

* cited by examiner

*Primary Examiner* — Douglas Blair
*Assistant Examiner* — Tan Doan
(74) *Attorney, Agent, or Firm* — Alexander G Jochym (57) ABSTRACT

In an approach for establishing metadata for one or more primary devices in a mirroring relationship, one or more computers systems generate a device validity token and establish a mirroring relationship, wherein the mirroring relationship includes identifying one or more primary devices of a plurality of devices in the mirroring relationship. The approach includes the computer systems sending the device validity token to each of a plurality of operating systems in the mirroring relationship for storage in a token store and retrieving a logical device identifier for each of the devices in the mirroring relationship. Furthermore, the approach includes the computer systems generating metadata for each of the primary devices, wherein metadata for each of the one or more primary devices includes at least the device validity token and the logical device identifier for each primary device of the one or more primary devices that generates the metadata.

17 Claims, 7 Drawing Sheets

PRIMARY DEVICE SELECTION AT OPERATING SYSTEM INITIALIZATION

BACKGROUND

The present invention relates generally to computers, and more particularly, to computer storage systems using data replication for high reliability systems.

A parallel sysplex or a system complex is a cluster of mainframe computers acting together as a single system image with an operating system such as z/OS®. A parallel sysplex is an example of a high-reliability system that allows multiple logical partitions to communicate and co-ordinate synchronized data storage and access for large-scale data storage. A parallel sysplex provides data sharing capabilities for accessing multiple databases to read and write as shared data. In applications, such as financial transactions requiring high-reliability systems, it is important to have multiple copies of data. High-reliability systems that utilize high-reliability storage systems typically use data replication to maintain a secondary copy (e.g., a secondary volume stored in one or more secondary devices) of the data stored in a primary volume on one or more primary devices. Computer systems or sysplex members requiring high-reliability storage systems typically employ data replication technologies, such as data mirroring, disk mirroring, data shadowing, or other similar replication schemes. Data mirroring technologies, such as peer-to-peer remote copy (PPRC) are used to keep data synchronized between at least two devices. Operating systems, such as z/OS and other operating systems employ data mirroring techniques that are controlled by replication or mirroring management software to improve data availability and to prevent data loss.

In some cases, planned or unplanned swapping between primary and secondary volumes occurs. A swapping function allowing the designation of the secondary volume as the primary volume is supported in high-reliability storage systems using various software functions and performs the swap in all members of the system complex. In this case, a secondary volume stored in one or more secondary devices becomes the new primary volume. In the event of a system or storage device failure, recovery can be initiated automatically with minimal or no data loss.

SUMMARY

Aspects of the present invention provide a method, computer program product, and a computer system for one or more computer systems establishing metadata for one or more primary devices in a mirroring relationship. The method includes one or more computer systems generating a device validity token and establishing a mirroring relationship, wherein the mirroring relationship includes identifying one or more primary devices of a plurality of devices in the mirroring relationship. The method includes one or more computer systems sending the device validity token to each of a plurality of operating systems in the mirroring relationship for storage in a token store and retrieving a logical device identifier for each of the plurality of devices in the mirroring relationship. Furthermore, the method includes one or more computer systems generating metadata for each of the one or more primary devices of the plurality of devices, wherein metadata for each of the one or more primary devices includes at least the device validity token and the logical device identifier for each primary device of the one or more primary devices that generates the metadata.

DETAILED DESCRIPTION

Embodiments of the present invention recognize that mirroring relationships are typically controlled using replication or mirroring management software, often in a set of coupled computer systems or in a set of mainframe systems sharing resources (e.g., a sysplex). The replication management software executes when an operating system is up and running. However, when an operating system is initialized, the replication management software is not up and running, and therefore is not available to identify which set of volumes in a mirroring relationship are to be used to initialize the operating system.

Embodiments of the present invention recognize when the replication management software is not running, the operating system that is being initialized must rely on one of the following methods. In a first method, the device mirroring relationships are established. In this method, the data on the secondary devices (i.e., devices containing a set of volumes not to be accessed) of the mirroring relationship is not accessible to the operating systems or to applications running on the operating systems. In a second method, the device mirroring relationships are not established; however, one device in each pair is in a fenced state, therefore leaving only a peer pair accessible. Devices can become fenced as a result of an enterprise-wide swap operation, ensuring that only the data on the desired devices remains accessible. A fenced device is inaccessible but in order to fence a device, the device must be accessible to the replication management software. However, there are conditions, such as a loss of connectivity that may prevent the device from being fenced; thereby leaving the data on the device accessible once connectivity is restored. In a third method, the device mirroring relationships are not established, and the secondary devices do not support fencing. In this method, an operator or systems programmer selects a set of primary devices thus, providing the possibility of human error resulting in an incorrect device selection. Embodiments of the present invention recognize that improvements are desired for the second method and the third method of selecting a device during operating system initialization.

Embodiments of the present invention provide a method to establish metadata that can be validated to ensure the correct selection of a set of one or more primary devices during an operating system initialization. Embodiments of the present invention provide a data validity token (DVT) assigned by the replication management software when mirroring relationships are first established. The DVT is a monotonically changing unique identifier or token that is shared and the same for each device in the mirroring relationship. The created DVT is shared with all of the devices and operating systems in the mirroring relationship.

Figure 5:
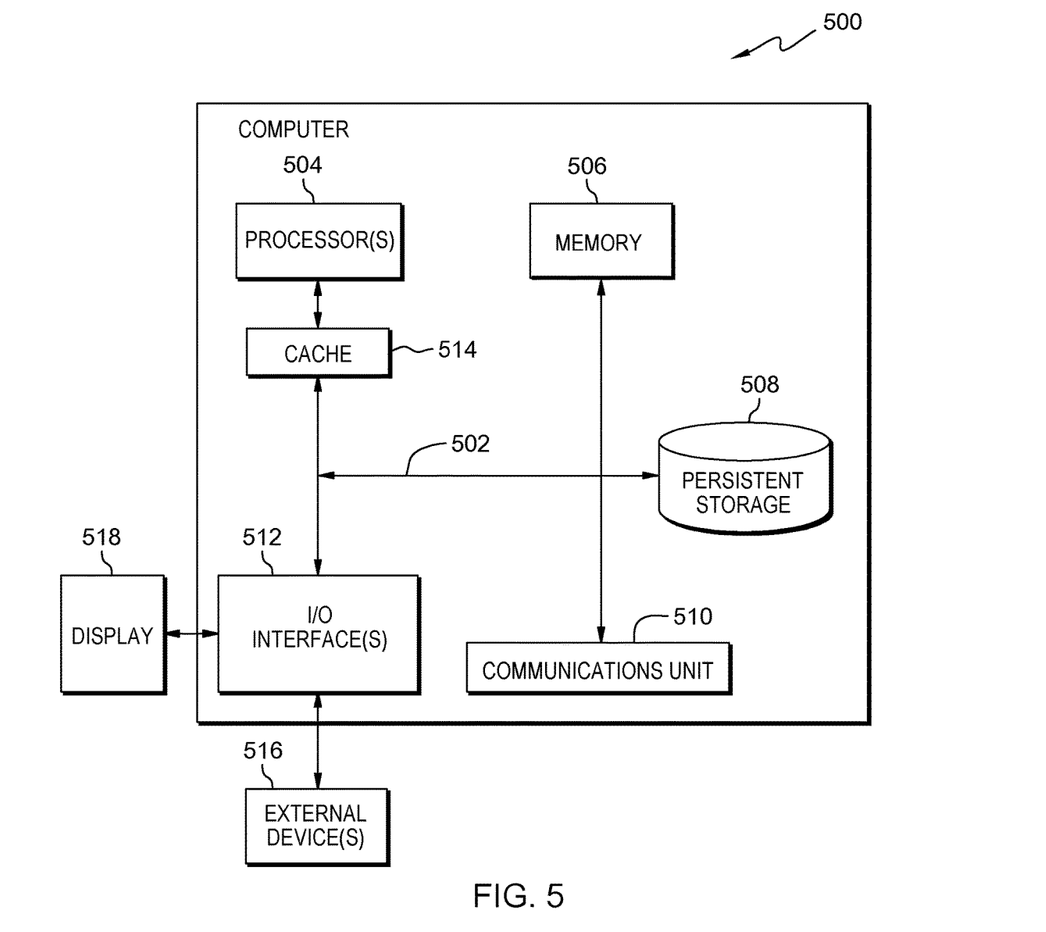
FIG. 5 depicts a block diagram of components of a computer system, such as the computer system of FIG. 1, in accordance with an illustrative embodiment of the present invention.

Embodiments of the present invention provide a method to utilize a logical device identifier (LDI) that is retrieved from each of the devices using a device dependent command and stored in a memory, such as memory 506 depicted in FIG. 5, or in a database. The LDI is an identifier that is unique to each device and when stored in the metadata the LDI identifies the primary devices in the mirroring relationship.

Embodiments of the present invention provide the ability to establish metadata for each device that consists of the received DVT and the device's read LDI where the metadata from the primary devices is written to the secondary devices during synchronous and asynchronous data replication in the mirroring relationship. Once the data is mirrored, the metadata containing the DVT and LDI on the secondary devices will reflect the DVT and LDI of the primary devices.

Furthermore, embodiments of the present invention utilize the ability to switch or swap the primary devices generating another or second DVT that is shared with all the devices and operating systems in the mirroring relationship and to generate new metadata including the new DVT and the device's LDI for each primary device.

Embodiments of the present invention provide the ability to determine the appropriate or correct device to use when an operating system initializes by validating or matching the DVT stored as a token in a token store in a computer to a DVT stored as metadata in a device, and also matching the actual device LDI for the device that is read from the device controller and compared to the LDI for a device that is stored in the metadata on the device. When the DVT retrieved from the token store matches the DVT in the device metadata and when the LDI in the device metadata matches the LDI read from the actual device being validated as a primary device, then, during system initialization, the device is brought on-line.

Figure 1:
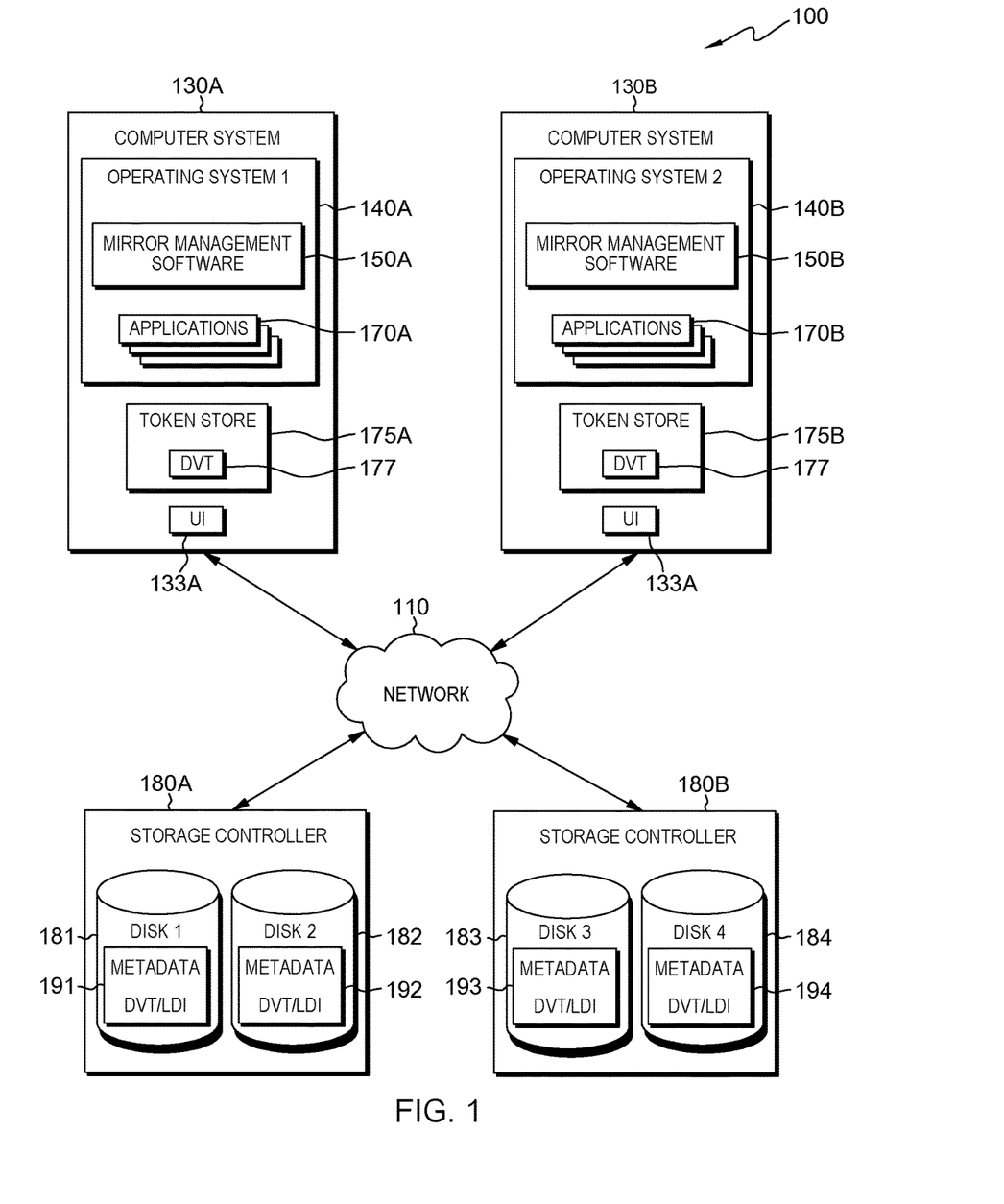
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computer systems 130A and 130B, storage controller 180A and 180B connected through a network depicted as network 110. Network 110 can include wired, wireless, or fiber optic connections such as fiber optic cables between computer systems 130A and 130B, storage controllers 180A and 180B, and any computing devices not depicted but included in distributed data processing environment 100. Network 110 can be, for example, a local area network (LAN), a virtual LAN (VLAN), Storage Area Network (SAN), a wide area network (WAN), such as the Internet, a telecommunications network, or a combination of the these networks. Network 110 can include one or more virtual, wired, and/or wireless networks that are capable of receiving and transmitting data. In general, network 110 can be any combination of connections and protocols that will support communications between computer systems 130A and 130B, storage controller 180A and 180B, and other computing devices (not shown) within distributed data processing environment 100.

Computer systems 130A and 130B can be a mainframe computer, a management server computer, a server system, standalone computing device, a mobile computing device, or any other electronic device or computing system capable of receiving, sending, and processing data. Computer systems 130A and 130B are any programmable electronic device capable of communicating with storage controllers 180A and 180B, and other computing devices (not shown) within distributed data processing environment 100 via network 110. In various embodiments, computer systems 130A and 130B are mainframe computers. Furthermore, in various embodiments, computer systems 130A and 130B represent mainframe computers that are a part of a cluster of computer systems where the cluster is a plurality of mainframe computers that collaborate through specialized hardware and software to share resources and provide data sharing capabilities with a high degree of data integrity. In various embodiments, computer systems 130A and 130B are mainframe computers within a sysplex, a parallel sysplex, or a geographically dispersed parallel sysplex (GDPS®) where computer systems 130A and 130B may be in different geographic locations or cities. Computer systems 130A and 130B may be one of any clustered computer systems coordinated to act as a single system image. Additionally, computer systems 130A and 130B are computer systems in a mirroring relationship. While depicted as two computer systems 130A and 130B associated with two storage controllers 180A and 180B in FIG. 1, a plurality of computer systems and associated storage controllers may be present in a mirroring relationship. In an embodiment, computer systems 130A and 130B are a single computer system 130. Computer systems 130A and 130B as depicted in FIG. 1 include user interface (UI) 133A, operating systems 140A and 140B, respectively, mirror management 150A and 150B, respectively, applications 170A and 170B, respectively, token store 175A and 175B, respectively, DVT 177, and other software and hardware elements not included in FIG. 1. In various embodiments, token store 175A and 175B reside in a hardware system area (HSA) in a respective computer system (e.g., computer system 130A and computer system 130B). For example, DVT 177 in token store 175A is stored in the HSA on computer system 130A. In some embodiments, token store 175A and 175B reside in another hardware storage area or a database (not shown in FIG. 1) in computer system 130A and 130B, respectively. While operating system 140A (e.g., depicted as operating system 1) is shown on computer system 130A, as known to one skilled in the art, more than one operating system may run on computer system 130A.

Computer systems 130A and 130B are connected via network 110 to storage controllers 180A and 180B. Computer systems 130A and 130B send and receive data from storage controllers 180A and 180B. Additionally, computer systems 130A and 130B using mirror management software 150A and 150B provide the capability for establishing and maintaining replication relationships for mirroring data in storage controllers 180A and 180B. Computer systems 130A and 130B may receive information, such as a client input for establishing a mirroring relationship on one of UI 133A. Computer systems 130A and 130B may receive a user or client input for selecting mirroring relationships that is provided to mirror management software 150A and 150B. Computer systems 130A and 130B may include internal and external hardware components, as depicted and described in further detail with respect to FIG. 5.

UI 133A on computer systems 130A and 130B is a user interface providing an interface between a user of computer systems 130A and 130B and enables a user of computer systems 130A and 130B to interact with programs and data on storage controllers 180A and 180B and other computing devices (not shown).

UI 133A may be a graphical user interface (GUI), an active area or line for text inputs, a web user interface (WUI), or other type of user interface and can display user options, application interfaces, and instructions for establishing a mirroring relationship using mirror management software 150A and 150B, and includes displaying information that a program or application may present to a user. In an embodiment, UI 133A receives a user input via a touch screen, a keyboard, a mouse, a display, an audio, visual or motion sensing device or other peripheral device standard in computer devices. UI 133A may be used by a user to send a user selection, or generate a query and to display to the user data from mirror management software 150A and 150B, storage controllers 180A and 180B, or applications 170A and 170B.

Operating systems 140A and 140B are system software that manages computer hardware and software resources to provide common services for computer programs and applications. In some embodiments, operating systems 140A and 140B use operating system virtualization. As known to one skilled in the art, operating system virtualization is the use of software to allow system hardware to run multiple instances of different operating systems concurrently, allowing you to run different applications that require different operating systems on one computer system. Operating systems 140A and 140B abbreviated as OS 140A and 140B supports mirror management software 150A and 150B, which are system applications, respectively, and applications 170A and 170B. While mirror management software 150A and 150B and applications 170A and 170B are depicted in OS 140A and 140B respectively, for ease of visualization, in actuality as known to one skilled in the art, mirror management software 150A and 150B and applications 170A and 170B are managed by OS 140A and 140B (e.g., the applications run on OS 140A and 140B) and do not reside in OS 140A and 140B. OS 140A and 140B manage program and applications, such as applications 170A and 170B, send and receive data including queries, commands, and data including DVTs and LDIs to storage controllers 180A and 180B and other computing devices in distributed data processing environment 100 not depicted in FIG. 1. As known to one skilled in the art, OS 140A and 140B provide support and management for applications 170A and 170B and mirror management software 150A and 150B in addition to other programs not shown in FIG. 1.

Mirror management software 150A and 150B provides and coordinates the initiation of various replication technologies of logical disk volumes onto separate storage devices (e.g., disks) for data storage. In various embodiments, mirror management software 150A and 150B manages synchronous replication of data in storage devices. While mirror management software 150A and 150B initiates synchronous replication of data in storage devices, embodiments of the present invention are not limited to replication using synchronous replication but also can be utilized when asynchronous replication is managed with mirror management software 150A and 150B. In various embodiments, the control units or control blocks manage the actual data replication based on mirror management software provide direction.

Mirror management software 150A and 150B may initiate synchronous replication using device specific commands where a primary volume of data is copied from one or more primary storage devices to a secondary volume of data in one or more secondary storage devices for redundancy or multiple of data sets in the event of a hardware or software failure, or other disruption to primary volume availability. In various embodiments, the primary and the secondary devices are one of physical storage devices (e.g., physical disks) or virtual storage devices. For simplicity, primary storage devices and secondary storage devices are called primary devices and secondary devices henceforth. Mirror management software 150A and 150B include replication management and swap managers. For example, mirror management software 150A and 150B may include an IBM HyperSwap® replication management component, or another similar mirroring or shadowing software component.

Figure 2A:
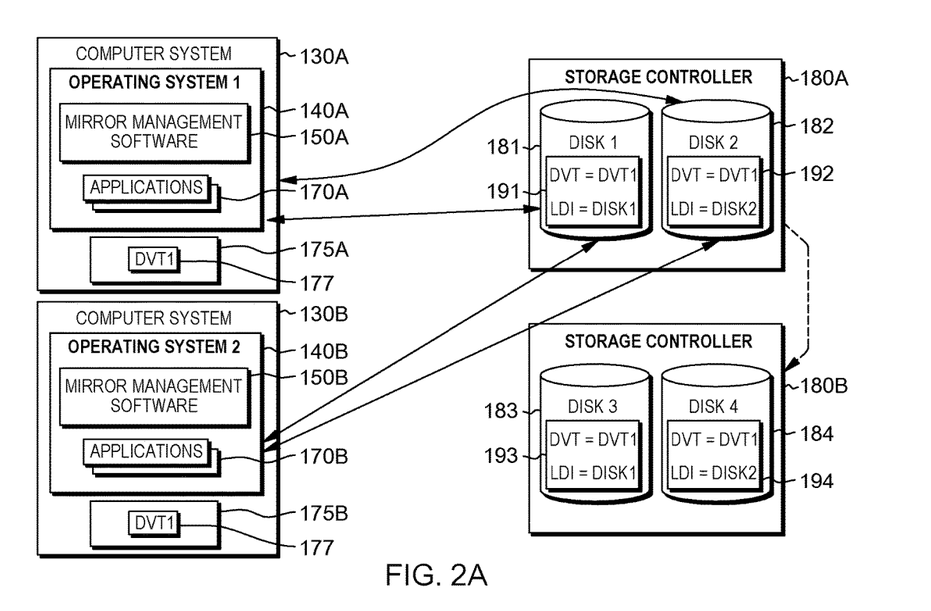
FIG. 2A is an example of an established mirroring relationship using a data validity coupon (DVT) and a logical device identifier (LDI) stored as metadata, in accordance with an embodiment of the present invention.

Mirror management software 150A and 150B coordinate and direct data replication on storage controller 180A and storage controller 180B in FIG. 1. While FIG. 1 depicts two storage controllers with two disks each in other embodiments, mirror management software 150A and 150B coordinates replication on a plurality of storage controllers each of which include a plurality of storage device pairs. Disk 1 and disk 2 in storage controller 180A are an example of a storage device pair as depicted in FIG. 2A. In some embodiments, mirror management software 150A and 150B coordinate more than two storage devices (e.g., three or more device or multi-target devices) for data replication and mirroring.

Mirror management software 150A and 150B coordinate the selection of primary devices and secondary devices and the swapping of primary and secondary devices. For example, mirror management software 150A and 150B may determine a master mirror management software of mirror management software 150A and 150B. A master mirror management software that is one of the mirror management software applications (e.g., one of mirror management software 150A and 150B) that coordinates swaps (i.e., a swap of a primary device to a secondary device and vice versa). The master mirror management software may be determined by the mirror management software running on a designated master operating system, by the mirror management software on a first up operating system, or by another pre-determined method for identifying a master mirror management system. In some embodiments, a master mirror management system is changed.

In various embodiments, one of mirror management software 150A and 150B (i.e., the master mirror management software) establish a mirroring relationship determining a set of one or more primary devices and generate a DVT shared with all of the operating systems in the mirroring relationship. Upon receipt of the DVT, each of the operating systems write the DVT to the token store in the respective computer system (e.g., OS 140A receives DVT 177 and writes DVT 177 to token store 175A). Additionally, when one of mirror management software 150A and 150B is establishing a mirroring relationship, the metadata including the DVT and a retrieved LDI specific to each primary device is written to metadata in each of the primary devices. When a swap or a switch of the primary and secondary devices occurs, one of mirror management software 150A and 150B identify the new primary devices, generates a new or second DVT (e.g. DVT 177N in FIG. 2B), and sends the new DVT to of the operating systems in the mirroring relationship. Additionally, at this time, one of mirror management software 150A and 150B determine the new primary device LDI for each device pair, and the new DVT and the LDI for the new primary device are written to the device metadata for the swapped to devices. In various embodiments, a LDI is one or more of a world-wide node name (WWNN), a logical unit number (LUN) identifier, or an I/O device node element descriptor (I/O NED) for extended-count-key-data (ECKD) devices. In some embodiments, a LDI is any unique self-identifying identifier for a device. While the mirroring management software is depicted in OS 140A and 140B in FIG. 1, in some embodiments, mirror management software 150A and 150B resides on storage controllers 180A and 180B.

Token store 175A and token store 175B, residing in computer system 130A and computer system 130B, respectively, provide a storage location for tokens, such as device validity token (e.g., DVT 177). Mirror management software 150A and 150B or OS 140A and 140B send or retrieve DVT 177 from token store 175A and 175B, respectively.

DVT 177 is a data validity token. DVT 177 is assigned by one of mirror management software 150A or 150B when the mirroring relationships are first established. For example, DVT 177 is assigned by the replication management software in mirror management 150A or 150B and is shared with all devices and operating systems in the mirroring relationship. The token or DVT 177 is written to the primary devices and stored as metadata along with the primary device LDI (e.g., retrieved using a device dependent command). The primary devices replicate all data including DVT 177 stored in metadata (e.g., metadata 191 and metadata 192 on storage controller 180A in FIG. 2A), which is written to the secondary devices (e.g., devices 183 and 184 in FIG. 2A). DVT 177 is the same for all operating systems and for all primary devices and secondary devices when the synchronous mirroring relationship is operating.

In various embodiments, a DVT is monotonically changing. For example, DVT 177 can be anything that allows the operating system to determine whether a DVT is out of date (e.g., a DVT is older than another stored DVT). An example of a DVT would be a time stamp. In some other embodiments, the DVT is ordered in linearly traceable manner or progressively changing in a trackable manner (e.g., alphabetically, numerically, by a pre-defined order, or alpha numerically). For example, a DVT may be a monotonically increasing (e.g., a time stamp, a letter, or increasing number) or decreasing element or identifier (e.g., a number or a fraction). DVT 177 is stored as metadata in each of the storage devices and in a token store, such as token store 175A and 175B in computer systems 130A and 130, respectively. DVT 177 is updated and shared with the storage devices and operating systems in the mirroring relationship when a swap of primary and secondary volumes occur. For example, a second DVT, such as DVT 177N that may reflect the time of a swap is generated and disseminated to the storage devices and operating systems within the mirroring relationship. DVT 177 may be retrieved by OS 140A and OS 140B during initialization and used to determine the most recent or correct primary devices. For example, as depicted in FIG. 2C and discussed later in detail, DVT 177N, which is DVT 2 the most recent DVT, is retrieved by OS 140A and used to validate the metadata in devices 181, 182, 183, and 184 to determine the correct (e.g., one or more primary devices) to bring on-line.

Applications 170A and 170B are various known applications or programs that run on OS 140A and 140B. Applications 170A and 170B may be one or more applications that may utilize the devices in storage controllers 180A and 180B to store and retrieve data.

Storage controllers 180A and 180B include two storage devices that each store metadata related to device usage in a mirroring relationship established and maintained by mirror management software 150A and 150B. For convenience, storage devices will be referred to as devices. Storage controllers 180A and 180B include devices 181 and 182 and devices 183 and 184, respectively with metadata 191 and 192 and metadata 193 and 194, respectively. While depicted in FIG. 1 as two storage controllers, in other embodiments, storage controllers 180A and 180B are a part of a plurality of storage controllers interacting with computer systems 130A and 130B.

Similarly, while two devices are depicted on each of storage controllers 180A and 180B, in other embodiments, storage controllers 180A and 180B each have a plurality of storage devices (e.g., a plurality of devices on storage controller 180A). Storage controllers 180A and 180B store, retrieve, and exchange data and queries with computer systems 130A and 130B using, for example, mirror management software 150A, mirror management software 150B, operating systems 140A and 140B, and applications 170A and 170B, respectively. While depicted on computer systems 130A and 130B, in some embodiments, mirror management software 150A and 150B reside on storage controllers 180A and 180B, respectively.

FIG. 2A is an example of an established mirroring relationship. In an established mirroring relationship, the mirror management software created metadata (i.e., metadata 191 and 192 on storage controller 180A) on the primary disks (i.e., DISK1 and DISK2) includes DVT 177 and LDI (DISK1) and LDI (DISK2) for devices 181 and 182, respectively, that is replicated to the secondary devices (i.e., devices 183 and 184). The metadata is replicated from the primary devices 181 and 182 to secondary devices 183 and 184, respectively, along with the data stored on the primary devices when a mirroring relationship is established, in accordance with embodiments of the present invention. In an established mirroring relationship illustrated in FIG. 2A, mirror management software 150A and 150B creates and retrieves DVT 177 identified as DVT1. Storage controllers 180A and 180B include metadata in devices 181, 182, 183, and 184 for disks 1, 2, 3, and 4 in the storage controllers. Metadata 191, 192, 193, and 194 in devices 181, 182, 183, and 184 created by the respective devices when the mirroring relationship was established includes the LDIs identifying the primary devices and the most recent DVT (i.e., DVT 177=DVT1).

In an established mirroring relationship, the metadata of a primary device matches the DVT stored in a token store of a computer system in the mirroring relationship with the DVT stored in the primary device and with the DVT in the secondary devices when synchronous data replication occurs. Additionally, in an established mirroring relationship, the actual retrieved LDI of the device matches the primary device LDI stored in the device's metadata for the one or more primary devices. Since metadata 191 for a primary LDI (LDI=Disk 1) stored in device 181 matches the actual or read LDI of device 181 (LDI of device 181=Disk 1) and DVT 177=DVT1 stored in device 181, metadata 191 matches DVT 177 (i.e., DVT1) retrieved from the token store and OS 140B, device 181 (Disk 1) is a device to be used (e.g., a current primary device that is on-line). Similarly, the primary LDI (i.e., LDI=Disk 2) stored in device 182's metadata (i.e., metadata 192) matches the actual read device LDI (Disk 2) for device 182 and DVT 177 (DVT1) stored on OS 140A and 140B matches the DVT stored in metadata 192 (DVT=DVT1), device 182 (Disk 2) is another device to be used (e.g., another current primary device). Applications 170A and 170B access primary devices 181 and 182 in storage controller 180A for data storage and retrieval as indicated by the arrows between applications 170A and 170B in OS 140A and 140B to devices 181 and 182. Additionally, as is the case in synchronous replication using atomic write operation (i.e., data is either written to both volumes or not written at all), data written to primary devices 181 and 182 in storage controller 180A is also written on secondary devices 183 and 184 in storage controller 180B as illustrated by the dashed arrows.

Figure 2B:
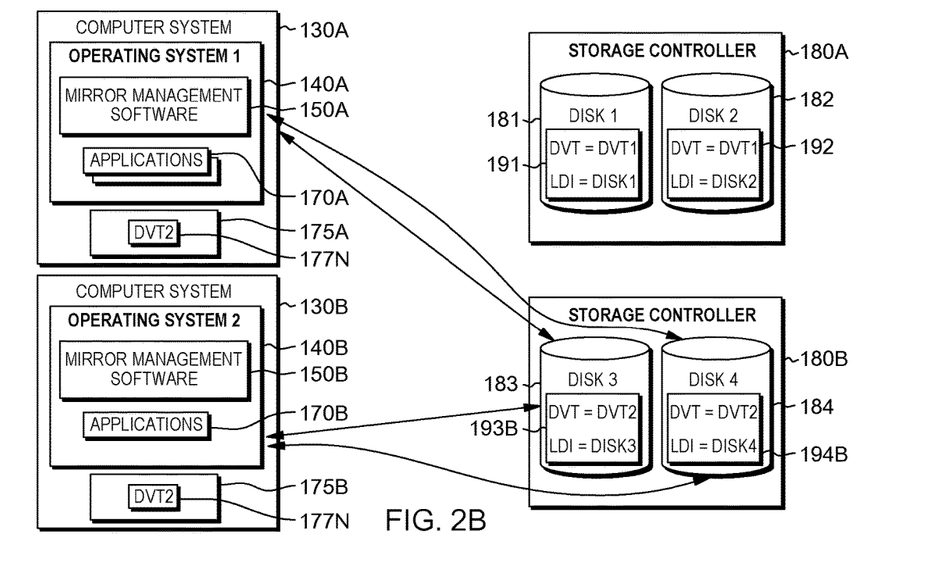
FIG. 2B is an example of a volume swap before mirroring is initiated, in accordance with an embodiment of the present invention.
Figure 2C:
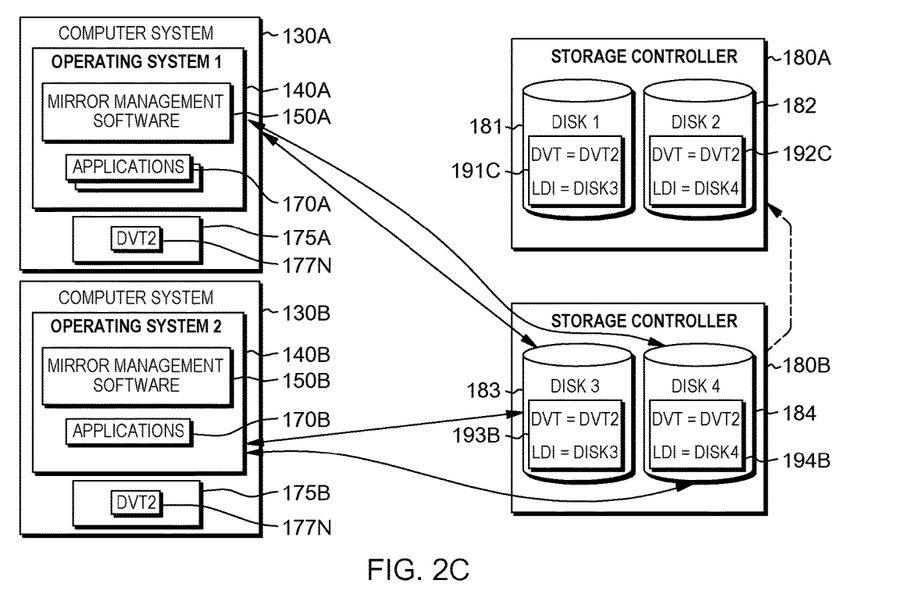
FIG. 2C is an example of a reverse mirroring relationship established after the volume swap depicted in FIG. 2B, in accordance with an embodiment of the present invention.

FIG. 2B is an example of an environment after a volume swap has occurred in the mirroring relationship depicted in FIG. 2A, in accordance with an embodiment of the present invention. When a loss of connectivity to the active devices or some permanent errors occur, mirror management software 150A or 150B quiesce I/O and facilitates the volume switch on all operating systems using the devices that severs or ends the mirroring relationship.

A new and unique DVT (i.e., DVT 177N) is recomputed and communicated to all of the operating systems (OS 140A and OS 140B), which write the new DVT to the token store in the respective computer system (e.g., computer systems 130A or 130B). The new DVT (e.g., DVT 177N) and the retrieved, self-identifying LDI of each new primary device (i.e., LDI=Disk 3 and LDI=Disk 4 for primary devices 183 and 184, respectively) are written as metadata stored in the respective new primary device (e.g., metadata 193B for Disk 3 and metadata 194B for Disk 4, respectively). For example, metadata 193B for primary device 183 includes LDI=Disk 3 identifying device 183 (i.e., disk 3) and the new DVT (i.e., DVT 177N) that is also shared with all of the OS in the mirroring relationship (i.e., OS 140A and 140B) as depicted in FIG. 2B. Devices 183 and 184 are now identified as primary devices and the metadata in device 183 and device 184 matches DVT 177N (i.e., DVT 2) and the primary device LDI stored in the metadata (i.e., LDI=Disk 3 and LDI=Disk 4, respectively) matches the LDI of the respective devices (i.e., LDI=Disk 3 for device 183) matches the primary device LDI (i.e., LDI=Disk 3) stored in device 183 metadata (e.g., metadata 193B).

FIG. 2C is an example of a reverse a mirroring relationship established after the volume swap depicted in FIG. 2B, in accordance with an embodiment of the present invention. After the volume swap occurs as depicted in FIG. 2B, primary devices 183 and 184 copy the data from disk 3 and disk 4 including metadata 193B and metadata 194B to secondary devices 181 and 182. Metadata 191C and 192C on devices 181 and 182, respectively, is copied to reflect the new DVT (e.g., DVT 177N=DVT 2) and the LDIs of the new primary devices (e.g., LDI=Disk 3 and LDI=Disk 4, respectively). In this example, applications 170A and 170B retrieve and store data to primary devices 183 and 184 as illustrated and primary devices 183 and 184 synchronously replicate data to secondary devices 181 and 182 as shown by the dashed line.

Figure 2D:
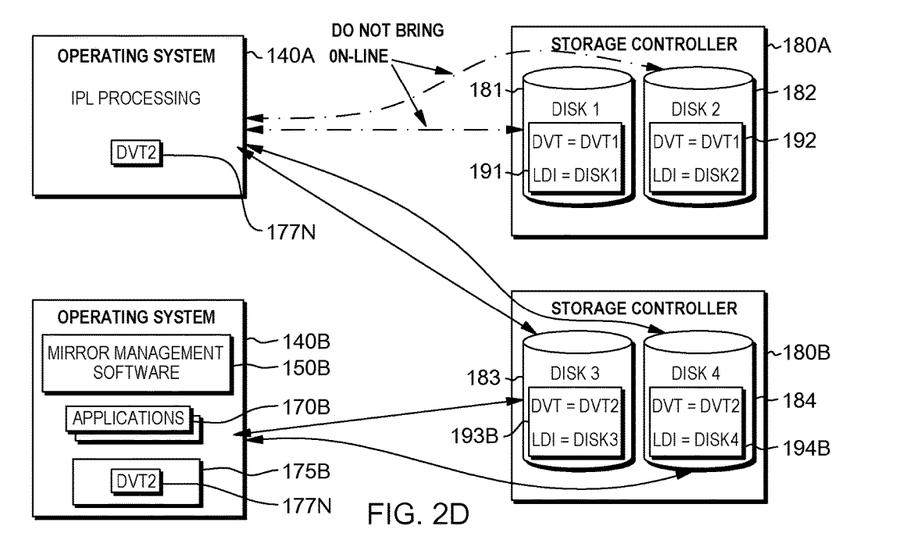
FIG. 2D is an example of an operating system initializing using a DVT and metadata when mirror management software is not accessible, in accordance with an embodiment of the present invention.

FIG. 2D is an example of an operating system initializing using a DVT and metadata when mirror management software is not accessible, in accordance with an embodiment of the present invention. In this case, no mirroring may be in effect and all devices are accessible. For example, when OS 140A is initialized or undergoes initial program load (IPL) as illustrated in FIG. 2D mirror management software 150A and applications 170A are not yet available to identify the correct storage devices (i.e., primary devices) to bring on-line. After retrieving the validity token DVT 177N stored as DVT2 from token store 175A in computer system 130A, OS 140A can identify the devices to bring on-line and make available by matching the DVT stored in metadata 191, 192, 193B, and 194B to DVT 177N stored in OS 140A. As shown in FIG. 2D, DVT 177N has been retrieved from token store 175A and is depicted in OS 140A for illustration purposes. DVT 177N is identified as DVT 2 matching DVT 2 as stored in device metadata 193B and 194B associated with devices 183 (Disk 3) and device 184 (Disk 4). Additionally, the primary device LDI stored in metadata 193 (LDI=Disk 3) matches the actual retrieved self-identifying device LDI (i.e., LDI=Disk 3 for device 183) and similarly, the actual retrieved self-identifying device LDI (LDI=Disk 4) matches metadata 194. Since metadata 193 and 194 matches the current DVT (i.e. DVT2) and the actual device LDIs match the respective device metadata, then both devices 183 and 184 are identified by OS 140A as primary devices and are brought on-line. Since the DVT (DVT1) stored in devices 181 and 182 does not match DVT 177N stored in OS 140A, OS 140A determines that devices 181 and 182 are not primary devices. OS 140A does not bring devices 181 and 182 on-line.

Figure 3A:
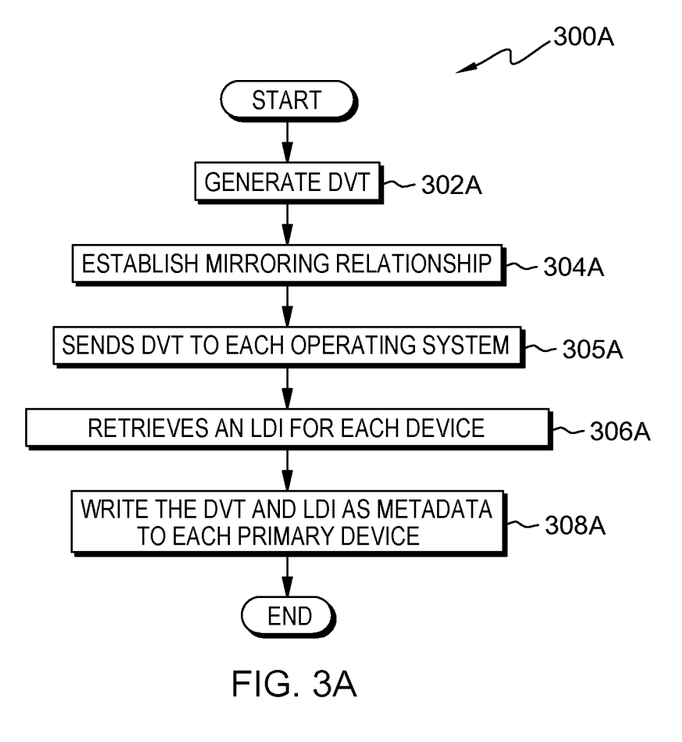
FIG. 3A is a flowchart depicting operational steps for a method of establishing and propagating metadata in a mirroring relationship, in accordance with an embodiment of the present invention.

FIG. 3 is a flowchart 300A depicting operational steps for a establishing and propagating metadata in a mirroring relationship, in accordance with an embodiment of the present invention. In step 302A, one of mirror management software 150A and 150B generates a DVT. One of mirror management software 150A and 150B (e.g., the master mirror management software of 150A and 150B determined by one of the previously discussed methods) assigns a DVT that is a monotonically increasing validity token. In various embodiments, the DVT, such as DVT 177, is a time stamp. The DVT is stored in a token store that may be in the HSA in the computers system generating DVT 177.

In step 304A, one of mirror management software 150A and 150B establishes a mirroring relationship. In various embodiments, one of mirror management software 150A and 150B have a GUI that a user or a client uses to propose the desired mirroring relationships. For example, using UI 135 a client may input to mirror management software 150A or 150B one or more devices to be used as source devices (e.g., primary devices) in the mirroring relationship to be established. In various embodiments, upon receiving client input regarding a desired mirroring relationship, one of mirror management software 150A and 150B issues commands to the one or more devices (e.g., disks 1, 2, 3, and 4 in FIG. 2A) to establish the mirroring relationships. For example, one of mirror management software 150A and 150B may establish mirroring relationships by identifying device pairs (e.g., a primary device that copies data in real-time or synchronously to a secondary device in the device pair). In other embodiments, one of mirror management software 150A and 150B determines the primary devices. In an embodiment, mirroring relationships or mirroring relationship patterns are stored in a database or file that can be retrieved. DVT 177 is sent to all primary devices by one of mirror management software 150A and 150B in response to establishing the mirroring relationship. For example, as depicted in FIG. 2A, in an established mirroring relationship, primary devices 181 and 182 have DVT 177 stored in metadata 191 and 192 that has been replicated into metadata 193 and 194 on devices 183 and 184 (i.e., identified as secondary devices by mirror management software 150A or 150B).

In step 305A, one of mirror management software 150A and 150B sends the DVT to each operating system. One of mirror management software 150A and 150B shares the DVT each of the operating systems (e.g., OS 140A and 140B) in the mirroring relationship, which in turn write the DVT to the token store in the computer system associated with the respective operating system. For example, OS 140A receives the DVT (e.g., DVT 177) and writes the DVT in token store 175A.

In step 306A, one of mirror management software 150A and 150B retrieves an LDI for each device. The LDI for each device can be retrieved via a device dependent command. In an embodiment, the LDI is retrieved using another command or query. The LDI identifier is any identifier that is unique for each device and when written as metadata on each of the primary devices (e.g., primary devices 181 and 182 in FIG. 2A) identifies a primary device in the mirroring relationship. For example, metadata stored for the primary devices 181 and 182 in FIG. 2A is metadata 191 (DVT 177=DVT1 and LDI=DISK1) and metadata 192 (DVT=DVT1 and LDI=DISK2). As known to one skilled in the art, an LDI for disk 1 or device 181 may have a different alphanumeric identifier, a numeric identifier, or an alpha identifier. For example, as previously discussed, a LDI may be an I/O NED for an ECKD device.

In step 308A, one of mirror management software 150A and 150B writes the DVT and LDI as metadata to each primary device. One of mirror management software 150A and 150B writes DVT 177 and each primary device's received LDI as metadata to the associated primary device. For example, in FIG. 2A, one of mirror management 150A and 150B writes metadata 191 with DVT 177 stored as DVT1 and LDI=DISK 1 on primary device 181 and metadata 192 with DVT 177 stored as DVT1 and LDI=DISK 2 on primary device 182. As is the case with a synchronous mirroring replication, the data including the metadata in the primary devices is copied to secondary devices, for example, as depicted in FIG. 2A from devices 181 and 182 to devices 183 and 184, respectively, by the dotted line in FIG. 2A. Once the metadata is written, one of mirror management 150A and 150B sends the DVT to all of the operating systems in the mirroring relationship (e.g., in OS 140A and 140B).

Figure 3B:
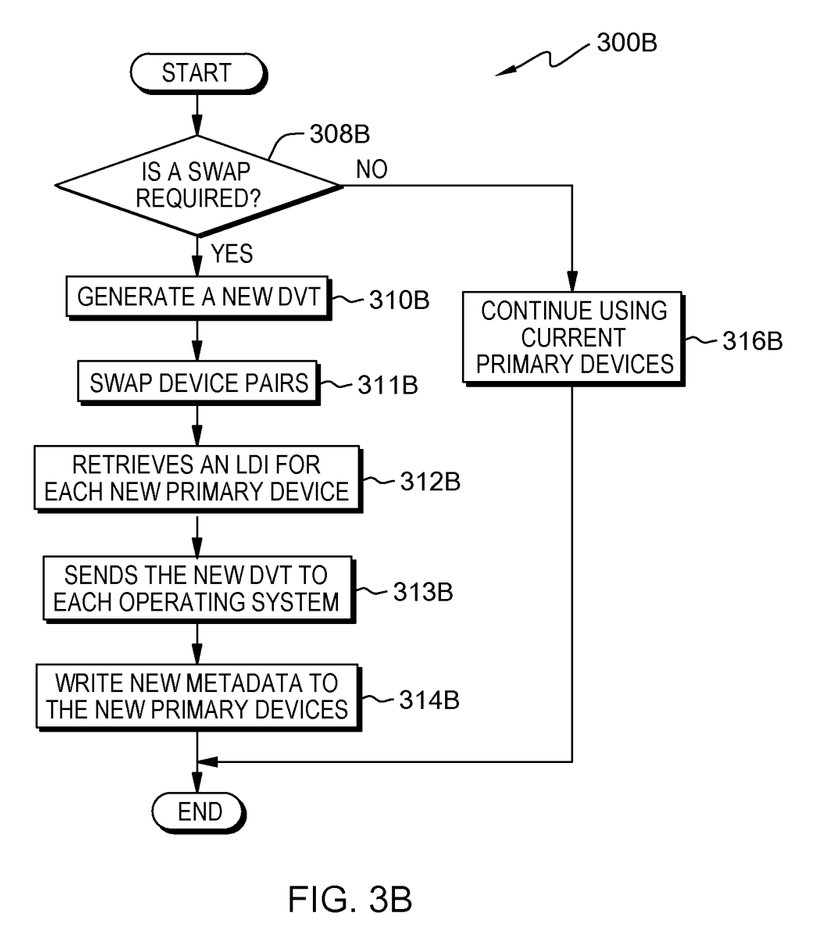
FIG. 3B is a flowchart depicting operational steps for a method of swapping devices in a mirroring relationship, in accordance with an embodiment of the present invention.

FIG. 3B is a flowchart 300B depicting operational steps for a method of swapping devices in a mirroring relationship, in accordance with an embodiment of the present invention. In decision step 308B, the system determines if a swap is required. For example, in the event of a planned volume swap, a loss of connectivity, or a permanent error, one of mirror management software 150A or 150B determines that a swap is required (yes branch of decision 308B).

When a swap is required then, one of mirror management software 150A and 150B generates a new DVT in step 310B. A new DVT, for example, a new time stamp, reflecting a change in the identified primary devices is generated by one of mirror management software 150A and 150B as discussed previously. For example, as depicted in FIG. 2B, mirror management software 150A generates a new DVT depicted as DVT 177N stored as DVT2 in token store 175A on computer system 130A.

In step 311B, each of mirror management software 150A and 150B swap the device pairs. When device is swapped mirror management software identifies the new devices to be used and the old primary devices can be taken off-line. One of mirror management software 150A and 150B generates a new DVT shared with all of the operating systems (e.g., OS 140A and 140B). For example, in FIG. 2B the device pairs consisting of device 181 (primary device) and device 183 (secondary device) and device 182 (primary device); and device 184 (secondary device) in FIG. 2A are swapped in FIG. 2B and devices 183 and 184 are now to be used.

In step 312B, each of mirror management software 150A and 150B retrieves an LDI for each new primary device. In various embodiments, when a LDI is known for the device, then a LDI is not retrieved. As previous discussed, the LDI for each device can be retrieved via a device dependent command. As previously discussed, one of mirror management software 150A and 150B retrieves from each device a device specific LDI using a device dependent command.

In step 313B, one of mirror management 150A and 150B sends the new DVT to each operating system. One of mirror management software 150A and 150B shares the DVT with each of the operating systems (e.g., OS 140A and 140B) in the mirroring relationship. Each of the operating systems in the mirroring relationship write the DVT in a token store residing in the computer system hosting the respective operating system.

Next in step 314B, each of mirror management software 150A and 150B write the new metadata to the new primary devices. The new DVT (e.g., DVT 177N stored as DVT 2) and the LDI retrieved for each of the primary devices is written as metadata in the respective primary device. The new metadata consists of the new DVT and the LDI for the new primary device that is stored on each of the new primary devices. For example, new primary device 183 in FIG. 2B includes new metadata 193B with DVT 177N stored as DVT2 and LDI stored as DISK 3. Updated metadata (e.g., metadata 193B and 194B) is established on the new primary devices (e.g., device 183 and device 184) that includes the new received DVT (e.g., DVT 177N=DVT2) and the respectively retrieved primary device LDI (LDI=Disk 3 for primary device 183 and LDI=Disk 4 for primary device 184), for example as depicted in FIGS. 2B and 2C. After the swap has occurred as depicted in FIG. 2C, one of mirror management 150A and 150B may establish the reverse mirroring where the data in the new primary devices including the new metadata (e.g., metadata 193B and 194B) with the new DVT and the LDI for each respective primary device is copied into the new secondary devices as depicted in FIG. 2D (e.g., as metadata 191C and 192C in new secondary devices 181 and 182 respectively). Once a reverse mirroring relationship is established by the mirroring management software, the old secondary devices become new primary devices that copy the data including the new metadata in the primary devices to the new secondary devices in the mirroring relationship. As illustrated in FIG. 2C, the new device pairs as a result of swapping are device 183 (primary device) and device 181 (secondary device); and device 184 (primary device) and device 182 (secondary device).

If a swap is not required, (no branch decision 308B), then the mirror management software 150A and 150B continue using the current primary devices (step 316B).

Figure 4:
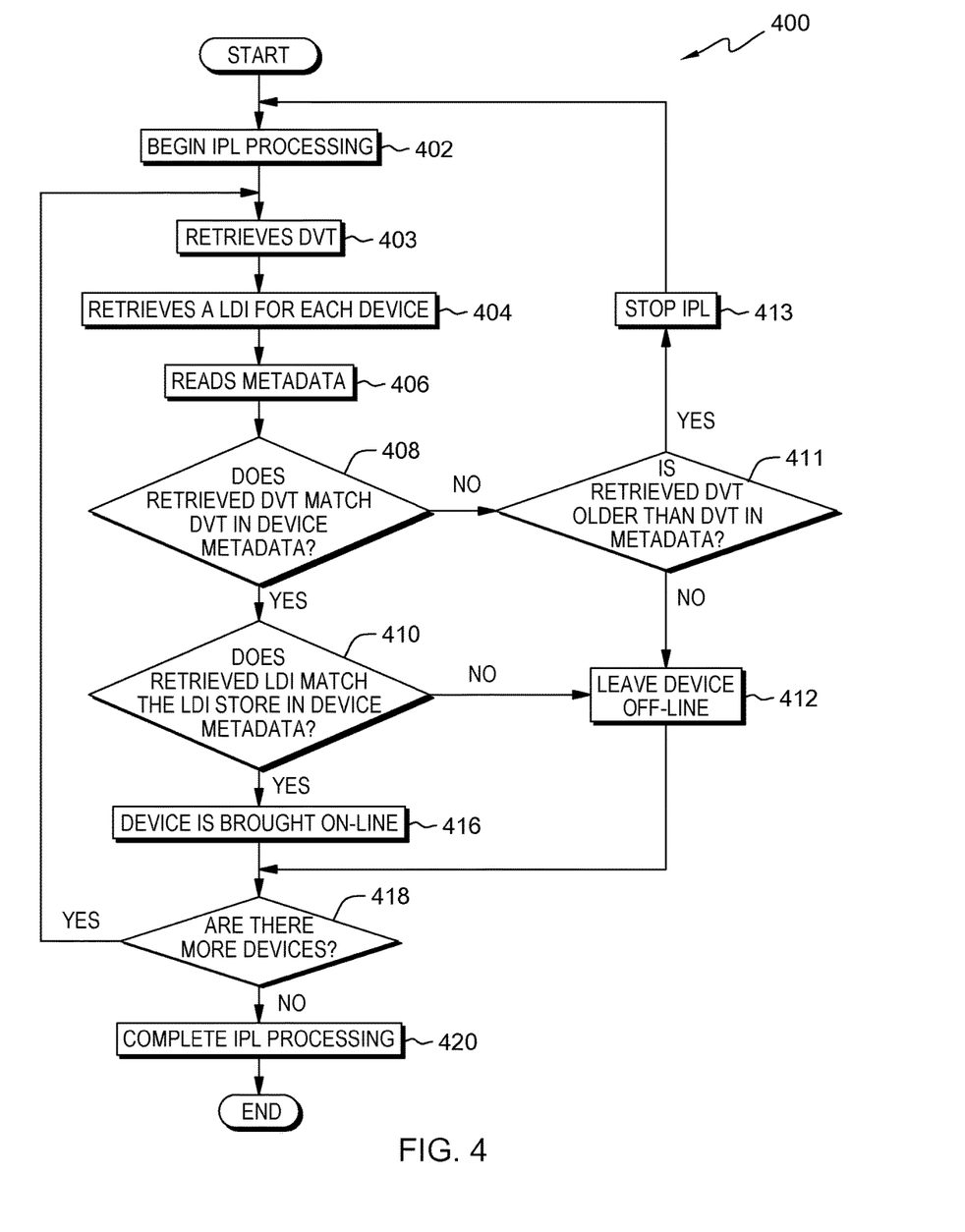
FIG. 4 is an example of a flowchart detailing the operational steps for initializing an operating system using metadata in a mirroring relationship, in accordance with an embodiment of the present invention.

FIG. 4 is an example of a flow chart 400 detailing the operational steps for initializing an operating system using metadata in a mirroring relationship, in accordance with an embodiment of the present invention. FIG. 4 provides the steps and details on how the operating system may utilize the generated metadata to identify the correct devices to bring on-line the operating system is loading during an initial program load (IPL). In particular, the use of the mirror management software generated metadata aids in the selection of the one or more primary devices to bring on-line when no mirroring relationship is intact. In step 402, an operating system, such as OS 140A begins IPL processing. At initialization, and with reference to previously discussed FIGS. 1, 2A, 2B, 2C, and 2D, mirror management software 150A is not yet available for OS 140A to receive data on primary devices that need to be brought on-line. In step 403, OS 140A retrieves the DVT. OS 140A retrieves DVT 177N from the token store 175A. In order to select the correct devices, OS 140A retrieves a LDI for each device in step 404. Using a device dependent command, OS 140A reads the LDI for each device in the mirroring relationship (e.g., reads actual LDI for devices 181, 182, 183, and 184). In step 406, OS 140A reads metadata. OS 140A reads metadata 191, 192, 193B, and 194B for each of the devices in the mirroring relationship. In various embodiments, the data in the secondary devices cannot be read. For example, when a secondary device is fenced, the device may not be accessed by OS 140A and the metadata cannot be read. In these embodiments, if the metadata for a device cannot be read, then the device is left off-line by OS 140A.

In decision step 408, OS 140A determines if the retrieved DVT matches the DVT in the device metadata. For example, the retrieved DVT obtained in step 403 is DVT 177N=DVT2 retrieved from the token store 175A in computer 130A is compared to a DVT stored in the metadata for each device (e.g., a DVT from each of metadata 191, 192, 193B, and 194B). For example, in FIG. 2D the DVT stored in metadata 191 and 192 is DVT 177=DVT1 and therefore, does not match DVT 177N=DVT2 stored in OS 140A (no branch of decision step 408), and in this case, devices 181 and 182 are determined not to be primary devices and OS 140A then determines if the retrieved DVT (e.g., from token store 175A) is older than the DVT in the metadata stored on the device (decision step 411). If OS 140A determines that the retrieved DVT (e.g., from token store 175A) is newer than the DVT in the metadata (no branch decision 411) stored on the device, then, the device is left off-line (step 412). However, if the retrieved DVT is older than the DVT in the metadata (yes branch decision 411) stored in the device, then OS 140A stops IPL (step 413) and a wait state is loaded thus causing the OS (e.g., OS 140A) to be IPLed under human direction, for example, from a systems programmer. This may occur when a OS running on a computer system (e.g., computer system 130A) that is down during a swap event, one of the mirror management systems running on a peer OS in an active computer system in the multi-system environment generates a new DVT shared with the running OS in the multi-system environment and written as metadata to the new active primary devices. While the running computer systems update the DVT in their token store, the down computer system does not (e.g., computer system 130A). In this case, if the OS on the down computer system (e.g., OS 140A) that is IPLing may encounter an old primary device with the same or old DVT that may not have yet been updated with the new DVT if mirroring in the reverse direction is not yet established and OS 140A may incorrectly validate the old primary devices.

However, the DVT stored in metadata 193B and 194B for both devices is DVT 177N=DVT2 which matches DVT 177N=DVT2 retrieved token store 175A by OS 140A (yes branch of decision step 408), OS 140A determines if the retrieved device LDI matches the LDI stored in metadata (decision 410). If retrieved device LDI, does not match the LDI stored in device metadata (no branch decision 410), then the device is left off-line (step 412). However, if the read LDI matches the LDI stored in metadata (yes branch decision 410), then the device is brought on-line (step 416). In FIG. 2D, for device 183 the read LDI is Disk 3 and the LDI stored in metadata 193B is LDI=Disk 3. Similarly, for device 184 the read LDI is Disk 4 and the LDI stored in metadata 194B is LDI=Disk 4. Therefore, since devices 183 and 184 match the DVT and LDIs in their respective metadata with DVT 177N=DVT2 stored in OS 140A and with each devices read LDI, devices 183 and 184 are determined to be primary devices by OS 140A and are made available or brought on-line during initialization.

In decision step 418, OS 140A determines if there are any more devices. If there are additional devices (yes branch of decision 418), then OS 140A returns to step 403 and continues the validity check to evaluate if devices are primary devices. If there are no additional devices (no branch of decision 418), then OS 140A completes IPL processing (step 420).

FIG. 5 depicts block diagram 500 of components of computer systems 130A and 130B in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer systems 130A and 130B include communications fabric 502, which provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of computer processor(s) 505 by holding recently accessed data, and data near accessed data, from memory 506.

Program instructions and data used for implementation of the invention, e.g., DVT 177, may be stored in persistent storage 508 and in memory 506 for execution by one or more of the respective computer processors 504 via cache 514. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used for implementations of the present invention may be downloaded to persistent storage 508 through communications unit 510.

I/O interface(s) 512 allows for input and output of data with other devices that may be connected to computer systems 130A and 130B. For example, I/O interface 512 may provide a connection to external devices 516 such as a keyboard, keypad, a touch screen, and/or some other suitable input device. External devices 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method for establishing metadata for one or more primary devices in a mirroring relationship, the method comprising:
    generating, by one or more computers, a device validity token;
    establishing, by one or more computers, a mirroring relationship, wherein the mirroring relationship includes identifying one or more primary devices of a plurality of devices in the mirroring relationship;
    sending, by one or more computers, the device validity token to each of a plurality of operating systems in the mirroring relationship for storage in a token store;
    retrieving, by one or more computers, a logical device identifier for each of the plurality of devices in the mirroring relationship;
    generating, by one or more computers, metadata for each of the one or more primary devices of the plurality of devices in the mirroring relationship, wherein metadata for each of the one or more primary devices of the plurality of devices in the mirroring relationship includes at least the device validity token and the logical device identifier for each primary device of the one or more primary devices of the plurality of devices in the mirroring relationship generating metadata
    retrieving, by one or more computers, the device validity token from the token store when the operating system initialization begins;
    determining, by one or more computers, whether metadata from each device of the plurality of devices in the mirroring relationship can be read;
    responsive to determining that metadata can be read, determining, by one or more computers, whether the retrieved device validity token matches the device validity token stored in metadata from each device of the plurality of devices in the mirroring relationship;
    responsive to determining that the retrieved device validity token matches the device validity token stored in metadata for each device of the plurality of devices in the mirroring relationship, determining, by one or more computers, that the retrieved device logical device identifier matches the logical device identifier stored in the metadata for each device of the plurality of devices in the mirroring relationship; and
    bringing, by one or more computers, each device of the plurality of devices in the mirroring relationship with the retrieved device validity token and the retrieved device logical identifier that matches the device validity token and the logical device identifier stored in the metadata for each device of the plurality of devices in the mirroring relationship on-line when an operating system is initialized.

2. The method of claim 1, further comprises using a device dependent command to retrieve the logical device identifier for each of the one or more primary devices.

3. The method of claim 1, wherein the logical device identifier is a unique device identification.

4. The method of claim 1, wherein the device validity token is a monotonically changing identifier that can be progressively tracked to determine a most current device validity token.

5. The method of claim 1, wherein the device validity token is a time stamp.

6. The method of claim 1, further comprises:
    determining, by one or more computers, that a swap is required in the mirroring relationship;
    generating, by one or more computers, a second device validity token;
    swapping, by one or more computers, each of a primary device and a secondary device in a device pair of one or more device pairs in the mirroring relationship such that the secondary device in the device pair becomes a second primary device in a swapped device pair of one or more swapped device pairs in the mirroring relationship:
        wherein the device pair consists of a primary device of the one or more primary devices of the plurality of devices in the mirroring relationship and a secondary device of one or more secondary devices of the plurality of devices in the mirroring relationship;
    retrieving, by one or more computers, a logical device identifier for each second primary device in each swapped device pair of the one or more swapped device pairs in the mirroring relationship;
    sending, by one or more computers, the second device validity token to each second primary device in each swapped device pair of the one or more swapped device pairs in the mirroring relationship and to each of the plurality of operating systems in the mirroring relationship; and writing, by one or more computers, a second metadata to each second primary device in each swapped device pair of the one or more swapped device pairs in the mirroring relationship wherein the second metadata for each of the one or more second primary devices in each swapped device pair of the one or more swapped device pairs in the mirroring relationship includes at least the second device validity token and the logical device identifier for each second primary device.

7. The method of claim 6, wherein swapping each of the primary device and the secondary device in the device pair of the one or more device pairs in the mirroring relationship includes changing each primary device in the device pair of the one or more device pairs to a second secondary device in the swapped device pair of the one or more swapped device pairs in the mirroring relationship.

8. A computer program product for establishing metadata for one or more primary devices in a mirroring relationship, the computer program product comprising:
one or more computer readable storage media and program instructions stored on the one or more computer readable storage media, the program instructions executable by a processor, the program instructions comprising:
program instructions to generate a device validity token;
program instructions to establish a mirroring relationship, wherein the mirroring relationship includes identifying one or more primary devices of a plurality of devices in the mirroring relationship;
program instructions to send the device validity token to each of a plurality of operating systems in the mirroring relationship for storage in a token store;
program instructions to retrieve a logical device identifier for each of the plurality of devices in the mirroring relationship;
program instructions to generate metadata for each of the one or more primary devices of the plurality of devices in the mirroring relationship, wherein metadata for each of the one or more primary devices of the plurality of devices in the mirroring relationship includes at least the device validity token and the logical device identifier for each primary device of the one or more primary devices of the plurality of devices in the mirroring relationship generating metadata;
program instructions to retrieve the device validity token from the token store from each device of the plurality of devices in the mirroring relationship when the operating system initialization begins;
program instructions to determine whether metadata from each device of the plurality of devices in the mirroring relationship can be read;
responsive to determining that metadata can be read, program instructions to determine whether the retrieved device validity token matches the device validity token stored in metadata for each device of the plurality of devices in the mirroring relationship;
responsive to determining that the retrieved device validity token matches the device validity token stored in metadata for each device of the plurality of devices in the mirroring relationship, program instructions to determine whether the retrieved device logical device identifier matches the logical device identifier stored in the metadata for each device of the plurality of devices in the mirroring relationship; and bringing, by one or more computers, each device of the plurality of devices in the mirroring relationship with the retrieved device validity token and the retrieved device logical identifier that matches the device validity token and the logical device identifier stored in the metadata for each device of the plurality of devices in the mirroring relationship on-line when an operating system is initialized.

9. The computer program product of claim 8, further comprises program instructions to use a device dependent command to retrieve the logical device identifier for each of the one or more primary devices.

10. The computer program product of claim 8, wherein the logical device identifier is a unique device identification.

11. The computer program product of claim 8, wherein the device validity token is a monotonically changing identifier that can be progressively tracked to determine a most current device validity token.

12. The computer program product of claim 8, wherein the device validity token is a time stamp.

13. The computer program product of claim 8, further comprises:
program instructions to determine that a swap is required in the mirroring relationship;
program instructions to generate, a second device validity token;
program instructions to swap each of a primary device and a secondary device in a device pair of a plurality of device pairs in the mirroring relationship:
wherein the device pair consists of a primary device of the one or more primary devices and a secondary device of the plurality of devices;
program instructions to retrieve an logical device identifier for each of one or more second primary devices;
program instructions to send the second device validity token to the one or more second primary devices and to each of the plurality of operating systems in the mirroring relationship; and
program instructions to write a second metadata to each of the one or more second primary devices.

14. The computer program product of claim 13, wherein program instructions to swap each of the primary devices and the secondary devices in the device pair of the plurality of device pairs includes changing each of the primary devices in the plurality of device pairs to a second secondary device in a second device pair and changing each of the secondary devices of the plurality of device pairs into a second primary device in the second device pair.

15. A computer system, for establishing metadata for one or more primary devices in a mirroring relationship, the computer system comprising:
one or more computer processors;
one or more computer readable storage media;
program instructions stored on the one or more computer readable storage media for execution by at least one of the one or more processors, the program instructions comprising:
program instructions to generate a device validity token;
program instructions to establish a mirroring relationship, wherein the mirroring relationship includes identifying one or more primary devices of a plurality of devices in the mirroring relationship;
program instructions to send the device validity token to each of a plurality of operating systems in the mirroring relationship for storage in a token store;

program instructions to retrieve a logical device identifier for each of the plurality of devices in the mirroring relationship;

program instructions to generate metadata for each of the one or more primary devices of the plurality of devices in the mirroring relationship, wherein metadata for each of the one or more primary devices of the plurality of devices in the mirroring relationship includes at least the device validity token and the logical device identifier for each primary device of the one or more primary devices of the plurality of devices in the mirroring relationship generating metadata program instructions to retrieve the device validity token from the token store when the operating system initialization begins;

program instructions to determine whether metadata from each device of the plurality of devices in the mirroring relationship can be read;

responsive to determining that metadata can be read, program instructions to determine whether the retrieved device validity token matches the device validity token stored in metadata for each device of the plurality of devices in the mirroring relationship;

responsive to determining that the retrieved device validity token matches the device validity token stored in metadata for each device of the plurality of devices in the mirroring relationship, program instructions to determine whether the retrieved device logical device identifier matches the logical device identifier stored in the metadata for each device of the plurality of devices in the mirroring relationship; and bringing, by one or more computers, each device of the plurality of devices in the mirroring relationship with the retrieved device validity token and the retrieved device logical identifier that matches the device validity token and the logical device identifier stored in the metadata for each device of the plurality of devices in the mirroring relationship on-line when an operating system is initialized.

16. The computer system of claim 15, wherein the logical device identifier is a unique device identification.

17. The computer system of claim 15, wherein the device validity token is a monotonically changing identifier that can be progressively tracked to determine a most current device validity token.

* * * * *